United States Patent [19]

Williams

[11] Patent Number: 4,760,000
[45] Date of Patent: Jul. 26, 1988

[54] BATTERY TERMINAL ASSEMBLY

[76] Inventor: Fred G. Williams, 1695 Epping Farm La., Annapolis, Md. 21404

[21] Appl. No.: 846,735

[22] Filed: Apr. 1, 1986

[51] Int. Cl.[4] ............................................. H01M 2/28
[52] U.S. Cl. ..................................... 429/121; 439/754
[58] Field of Search ................ 429/121, 178; 339/224, 339/226, 231, 235

[56] References Cited

U.S. PATENT DOCUMENTS

| | | | |
|---|---|---|---|
| 1,808,648 | 6/1931 | Fisher | 429/121 |
| 1,854,328 | 4/1932 | Binder | 429/121 |
| 1,993,893 | 3/1935 | Page, Jr. | 429/96 |
| 2,160,422 | 5/1939 | Shipman | 429/121 |
| 2,178,063 | 10/1939 | Brooks et al. | 429/121 |
| 2,475,543 | 7/1949 | Christen | 429/121 |
| 2,551,990 | 5/1951 | Wills | 429/96 |
| 2,621,222 | 12/1952 | Wirth | 339/224 |

FOREIGN PATENT DOCUMENTS 0038566  3/1982  Japan ................................. 429/178

Primary Examiner—John F. Niebling
Assistant Examiner—Steven P. Marquis
Attorney, Agent, or Firm—Bacon & Thomas

[57] ABSTRACT

An assembly for facilitating the quick connection and disconnection of appliance cables to the terminals of a storage battery and preventing corrosion at the terminals, including a pair of connectors defined by insulating caps enclosing conductive sleeves, and a releasable clamp engageable with the battery for securing the connectors against their respective terminals.

9 Claims, 2 Drawing Sheets

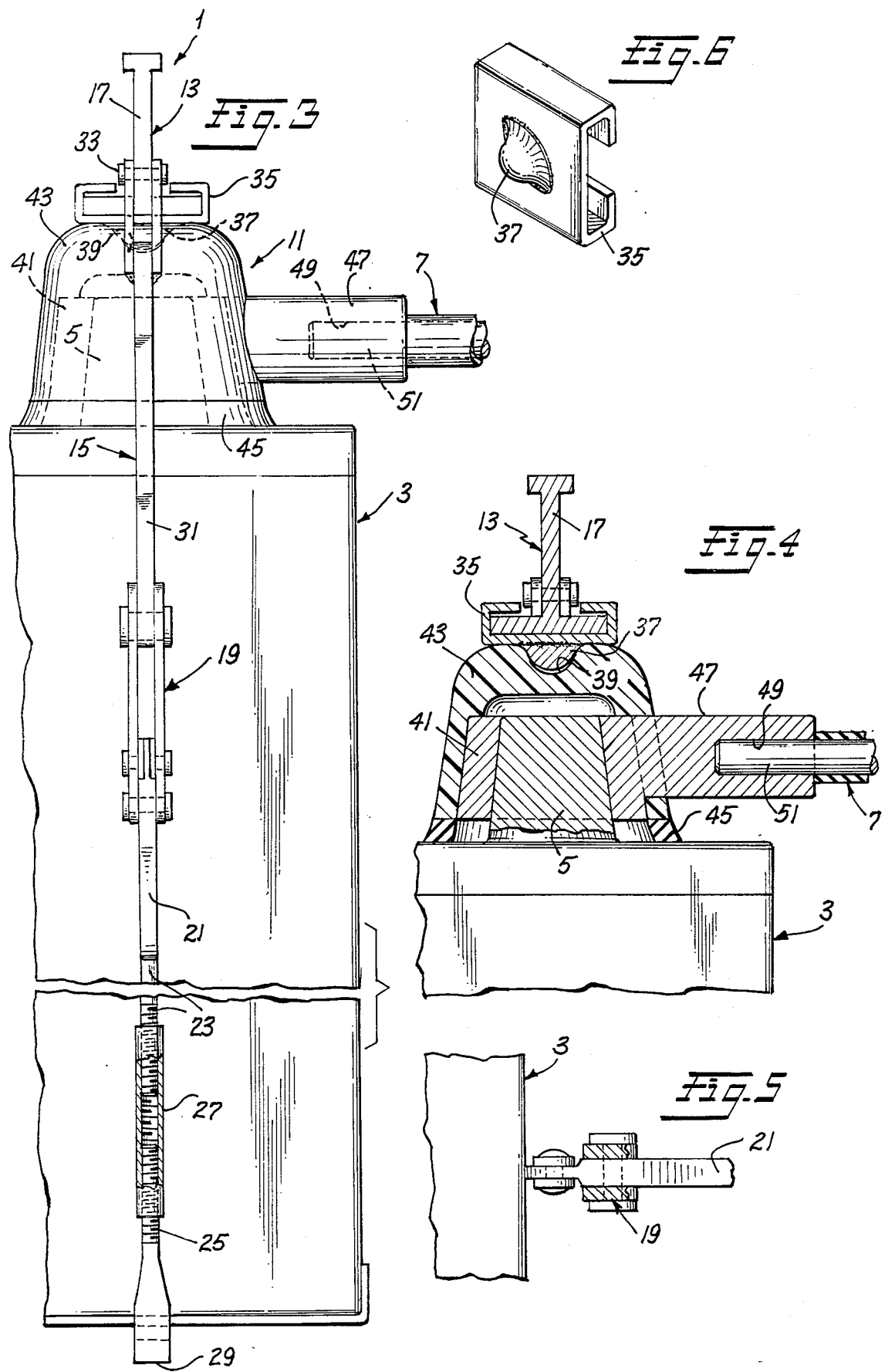

BATTERY TERMINAL ASSEMBLY

BACKGROUND OF THE INVENTION

1. Field of the Invention

The present invention generally involves the field of technology pertaining to storage batteries. More particularly, the invention relates to an improved means for quickly connecting and disconnecting appliance cables to the terminals of a storage battery.

2. Description of the Prior Art

A conventional storage battery is provided with a pair of terminals or posts of opposite polarity for connection to the corresponding conductor cables of an electrical appliance, such as the starter motor of a vehicle. This is usually accomplished by providing a clamp at the end of each appliance cable and tightening the clamp around the corresponding terminal of the battery. This arrangement has proven to be highly disadvantageous for two basic reasons. First, the attachment or removal of the clamps require the use of a wrench and is time consuming, particularly if the terminals of the battery are disposed at a position where the terminals are not readily accessible. Second, the terminals is subject to oxidation or corrosion, an undesirable situation which tends to shorten the effective life of the battery.

The prior art has recognized these disadvantages and has offered various solutions to overcome them. For example, the Page U.S. Pat. No. 1,993,893 and Wills U.S. Pat. No. 2,551,990 teach assemblies for facilitating the connection and disconnection of appliance cables to the terminals of a storage battery, and the Wirth U.S. Pat. No. 2,621,222 discloses a battery terminal connector element which is designed for avoiding corrosion at the terminal.

SUMMARY OF THE INVENTION

It is an object of the invention to provide an improved assembly for permitting the quick connection and disconnection of appliance cables to the terminals of a storage battery.

It is another object of the invention to provide an improved connector for connecting the end of an appliance cable to a terminal of a storage battery whereby corrosion at the terminal is eliminated.

It is a further object of the invention to provide an improved assembly for connecting and disconnecting appliance cables to the terminals of a storage battery wherein the assembly is adjustable for batteries having different spacings between terminals.

It is yet another object of the invention to provide an improved assembly for connecting and disconnecting appliance cables to the terminals of a storage battery wherein the assembly is of simple construction, economical to manufacture and extremely durable for long term use.

These and other objects of the invention are realized by providing an assembly which essentially comprises a pair of connectors for attachment to the ends of corresponding appliance cables and a clamp for releasably securing the connectors to the corresponding terminals of a storage battery. Each connector is defined by a conductive metal sleeve for snug engagement around a battery terminal and an insulating cap which encloses the sleeve, the cap including a peripheral boot which sealingly engages against the surface of the battery for preventing oxidation or corrosion at the terminal connection. The sleeve further includes an attachment portion that is preferably integrally formed therewith and extends laterally therefrom outwardly through the cap. The attachment portion preferably includes a recess for receiving the end of an appliance cable which may be either permanently or detachably joined to the attachment portion. The clamp includes a pair of slidable brackets, with each bracket being provided with a knob which engages a correspondingly-shaped recess provided in the top of the insulating cap. The brackets are supported on an elongate beam which carries a pair of adjustable linkages at its opposite ends for engaging the battery and applying pressure to the brackets for urging the knobs within their corresponding recesses to secure the connectors against the terminals. The linkages are each provided with an overcenter latch and a turnbuckle for varying the amount of force applied by the latch.

Other objects, features and advantages of the invention shall become apparent from the following detailed description of a preferred embodiment thereof when taken in conjunction with the drawings wherein like reference characters refer to corresponding parts in the several views.

BRIEF DESCRIPTION OF THE DRAWINGS

FIG. 3 is an enlarged fragmentary side elevational view as seen from the right of FIG. 2;

FIG. 4 is a fragmentary vertical sectional view, taken on the line 4—4 of FIG. 2;

FIG. 5 is a fragmentary horizontal sectional view, taken on the line 5—5 of FIG. 2; and FIG. 6 is an enlarged isometric view of a bracket associated with the clamp of the assembly.

DETAILED DESCRIPTION OF THE PREFERRED EMBODIMENT

Figure 1:
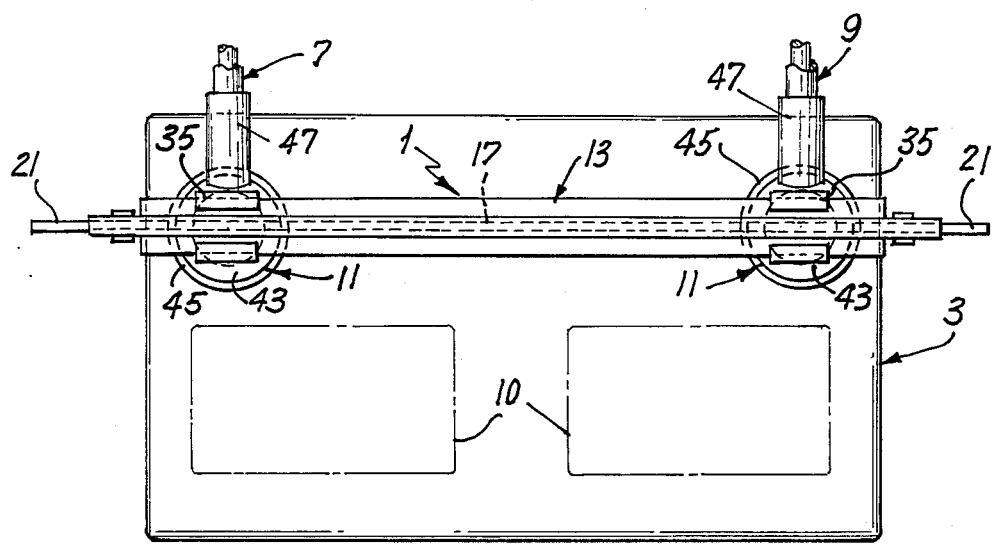
FIG. 1 is a plan view of a battery terminal assembly according to a preferred embodiment of the present invention.
Figure 2:
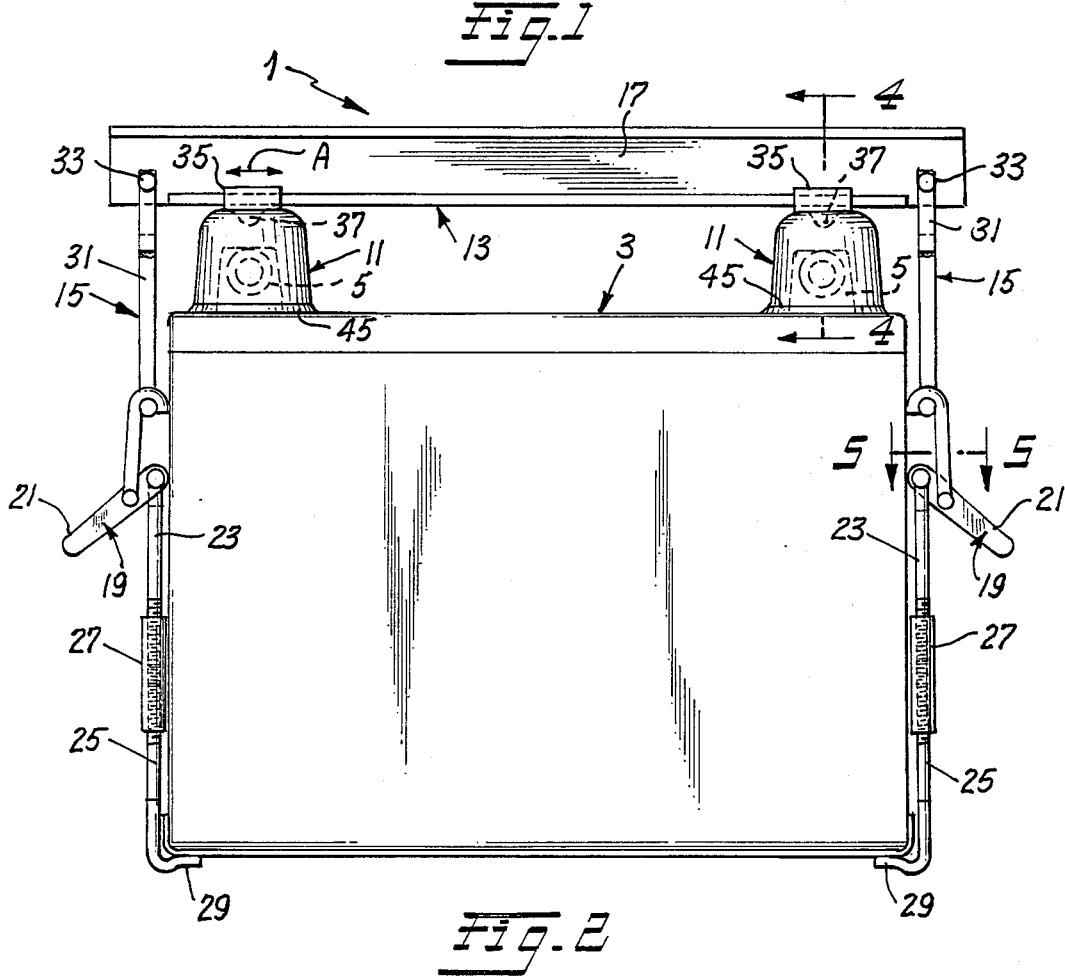
FIG. 2 is a front elevational view of the assembly of FIG. 1.

A battery terminal assembly 1, according to a preferred embodiment of the invention, shall now be described with initial reference to FIGS. 1 and 2. As shown therein, assembly 1 is installed on a storage battery 3 provided with a pair of upstanding terminals or posts 5 which are in electrical contact with an appliance (not shown), such as the electrical system of a vehicle, through a pair of insulated conductor cables 7 and 9. Battery 3 may be of any conventional type well known in the art, such as a lead storage battery having terminals 5 of opposed polarity and a pair of closure caps, shown generally at 10, for permitting the individual cells to be replenished with water. Battery 3 may also be of the fully sealed, no maintenance type without closure caps 10 or equivalent means for permitting access to the individual cells.

Assembly 1 is essentially defined by a pair of connectors 11 and a clamp 13. Each connector 11 is configured for engagement around a corresponding terminal 5 for defining an electrical connection between terminal 5 and its corresponding appliance cable 7. Connectors 11 are detachably secured to terminals 5 by clamp 13 through a pair of adjustable linkages 15 which are secured at one pair of corresponding ends to an elongate beam 17, and at their other pair of corresponding ends to the bottom of battery 3. Downward pressure is applied to the tops of connectors 11 by beam 17 through the actuation of an overcenter latch 19 forming a part of each linkage 15. The structure and function of latch 19 is conventional and well known in the art, with its basic function being the tensioning of linkage 15 and securing same in a locked position until released through the pivoting of a handle 21 outwardly, as shown in FIGS. 2 and 5. The amount of downward pressure applied by beam 17 can be controlled by varying the amount of tension imparted by latches 19 to linkages 15. This is accomplished by providing each linkage 15 with a turnbuckle mechanism defined by an upper threaded rod 23 and a lower threaded rod 25, the adjacent ends of rods 23 and 25 being threadedly engaged within a correspondingly threaded sleeve 27. The terminal ends of lower rods 25 are each provided with an inwardly directed hook portion 29 for engaging the bottom of battery 3. Each latch 19 is joined to a corresponding end of beam 17 through a link 31 which is connected directly to its corresponding end of beam 17 through a pivot connection 33. Though each linkage 15 has been described with an overcenter latch 19 for the purpose of imparting tension thereto, it is understood that other mechanisms for accomplishing this same function may also be utilized so long as the purpose and intent of the invention as disclosed herein are realized.

The details of connectors 11 and the manner in which beam 17 secures same to terminals 5 shall now be described with particular reference to FIGS. 3 and 4. As depicted therein, beam 17 has a substantially T-shaped transverse cross-sectional configuration. A pair of brackets 35 are slidably supported on beam 17 for longitudinal movement therealong in the opposite directions shown by the double arrow A depicted in FIG. 2. In this way, the longitudinal spacing between brackets 35 may be easily established in order to accommodate batteries having different spacings between opposed terminals. Each bracket 35 is provided with a downwardly extending knob 37 which is engageable within a correspondingly shaped recess 39 provided at the top of connector 11. This is more clearly shown in FIGS. 4 and 6. It is therefore apparent that, when downward pressure is applied by beam 17 through the actuation of linkages 15, the engagement of brackets 35 against connectors 11 is extremely secure and reliable. This eliminates the probability of connectors 11 accidentally shifting or becoming dislodged from terminals 5.

The details of connectors 11 shall now be described with specific reference to FIG. 4. Each connector 11 includes a conductive sleeve 41, preferably formed of lead or other suitable material, and configured for snug engagement around terminal 5. Sleeve 41 is enclosed by a cap 43 formed from an insulating material, preferably plastic, rubber or the like. Recess 39 is formed in the top of cap 43. A peripheral boot 45 is provided at the bottom of cap 43 for sealing engagement against the top surface of battery 3, thereby preventing oxidation or corrosion of terminal 5. Boot 45 is also formed from an insulating material, such as plastic or the like, and may be either separately attached to cap 43 or be integrally formed therewith. Sleeve 41 is provided with a conducting attachment portion 47, preferably integrally formed therewith of the same material. Portion 47 extends laterally from sleeve 41 and outwardly of cap 43, and is provided with a recess 49 for receiving a bare metal end 51 of cable 7. It is preferred that end 51 be permanently fused or bonded to connector portion 47 through any procedure well known in the art for establishing a positive electrical connection therebetween. Cap 43 is also preferably fused or bonded to sleeve 41 in any manner well known in the art, such as through the utilization of a mold and pouring molten Plaster Sol into the mold around sleeve 41 to form a bonded composite assembly. It is preferred that cap 43 be formed of vinyl plastic.

The application of assembly 1 to a battery shall now be described. Appliance cables 7 are first either permanently or detachably joined to attachment portions 47 of sleeves 41. Thereafter, connectors 11 are slipped onto their respective terminals 5 whereby sleeve 41 of each connector 11 is snugly engaged around its corresponding terminal 5. Brackets 35 are then adjusted along beam 17 to correspond to the spacing between terminals 5 so that knobs 37 of brackets 35 are disposed within their corresponding recesses 39 of connectors 11. Hook portions 29 of linkages 15 are then engaged around the bottom of battery 3. The overall length of linkages 15 may be adjusted by threading rods 23 and 25 either into or out of their corresponding sleeves 27. Thereafter, latches 19 are then actuated by pressing handles 21 downwardly towards the sides of battery 3 for applying tension to linkages 15 and causing beam 17 to press downwardly against the tops of connectors 11, thereby effecting a positive electrical connection between terminals 5 and cables 7. Removal of connectors 11 is accomplished in the reverse procedure.

As is apparent, assembly 1 of this invention now permits the extremely quick connection and disconnection of appliance cables 7 to terminals 5 battery 3. More importantly, this procedure may be accomplished for batteries positioned in restricted spaces which are difficult to access when conventional cable connectors are utilized. Moreover, cap 5 and its associated boot 45 serve to insulate, sealingly enclose and protect terminal 5 from the atmosphere, thereby preventing oxidation or corrosion of same. The presence of attachment portion 47 extending outwardly of cap 43 permits jumper cable clamps or similar devices to be attached thereto and be placed in electrical connection with terminals 5 without the necessity of removing assembly 1 when it is desired to provide another appliance with current from battery 3, such as in jump starting a vehicle.

It is to be understood that the forms of the invention herewith shown and described are to be taken as preferred examples of the same, and that various changes in the shape, size and arrangement of parts and compositions may be resorted to, without departing from the spirit of the invention or scope of the subjoined claims.

I claim:

1. A battery terminal assembly for detachably connecting electric appliance cables to the terminals of a storage battery comprising:
   (a) a pair of connectors;
   (b) a releasable clamp for clamping the connectors to the terminals;
   (c) each connector including:
      i. a conductive sleeve configured for snug engagement around a terminal of the battery,
      ii. an insulating cap for enclosing the sleeve, the cap including a top portion and means carried by the top portion for engagement by the clamp, and
      iii. a conductive attachment portion extending laterally from the sleeve and outwardly of the cap for connection to an appliance cable; and (d) the clamp includes:
  i. an elongate beam,
  ii. a pair of brackets slidably mounted on the beam, with each bracket being provided with a knob for engaging a recess of a corresponding cap, and
  iii. a pair of adjustable linkages carried by the beam for engaging the means carried by the top portions of the caps to the beam.

2. The assembly of claim 1 wherein each linkage includes an overcenter latch for imparting tension thereto, and means for varying the amount of tension imparted by the latch.

3. A battery terminal assembly for detachably connecting an electrical appliance cable to the terminal of a storage battery comprising:
(a) a connector including:
  i. a conductive sleeve configured for snug engagement around a terminal of the battery,
  ii. an insulating cap for enclosing the sleeve, the cap including a top portion, and
  iii. a conductive attachment portion extending laterally from the sleeve below the top portion and outwardly of the cap for connection to an appliance cable;
(b) a clamp for applying downward pressure against the top portion of the cap for securing the connector to the terminal, the clamp including:
  i. quick release means for attaching and detaching the clamp with respect to the top portion of the cap,
  ii. an elongate beam,
  iii. a bracket slidably mounted on the beam for engaging the top portion of the cap, and
  iv. a pair of adjustable linkages carried by the elongate beam for varying the amount of downward pressure applied by the clamp to the top portion of the cap.

4. The assembly of claim 3 wherein the quick release means includes an overcenter latch means carried by the clamp.

5. The assembly of claim 3 wherein the cap further includes a bottom portion and a peripheral boot extending from the bottom portion for sealingly engaging the battery and preventing corrosion at the terminal.

6. The assembly of claim 3 wherein the top portion of the cap is configured for engagement by the clamp.

7. The assembly of claim 3 wherein the cap is formed of nonconductive plastic material.

8. The assembly of claim 3 wherein the attachment portion and the sleeve are integrally formed of lead.

9. The assembly of claim 3 wherein the attachment portion includes a recess for receiving the end of the appliance cable.

* * * * *